United States Patent
Lubben et al.

(10) Patent No.: US 7,892,133 B2
(45) Date of Patent: Feb. 22, 2011

(54) OVER-CENTER LINKAGE FOR ENGAGING A LOCKING DIFFERENTIAL OR OTHER MECHANISM

(75) Inventors: Jeffrey L. Lubben, Pinckney, MI (US); Ryan McAlister, Allen Park, MI (US)

(73) Assignee: Metaldyne, LLC, Plymouth, MI (US)

( * ) Notice: Subject to any disclaimer, the term of this patent is extended or adjusted under 35 U.S.C. 154(b) by 605 days.

(21) Appl. No.: 11/731,688

(22) Filed: Mar. 30, 2007

(65) Prior Publication Data

US 2007/0249459 A1  Oct. 25, 2007

Related U.S. Application Data

(60) Provisional application No. 60/787,331, filed on Mar. 30, 2006.

(51) Int. Cl.
*F16H 48/20* (2006.01)
(52) U.S. Cl. .............. 475/231; 475/240; 74/473.28; 74/473.36
(58) Field of Classification Search ............ 475/231, 475/233, 235, 249, 230, 240; 74/473.1, 473.21, 74/473.36, 405, 411
See application file for complete search history.

(56) References Cited

U.S. PATENT DOCUMENTS

| | | | |
|---|---|---|---|
| 851,956 A | 4/1902 | McMahon | |
| 1,032,261 A | 7/1912 | Wright et al. | |
| 1,125,079 A | 1/1915 | Dyer | |
| 1,145,295 A | 7/1915 | De Witt | |
| 1,272,081 A | 7/1918 | Nutting et al. | |
| 2,121,254 A | 6/1938 | Meinke | |
| 2,626,032 A | 1/1953 | De Coursey | |
| 3,072,235 A | 1/1963 | Aschauer | |
| 3,533,301 A * | 10/1970 | Hausinger | 74/473.21 |
| 3,871,249 A | 3/1975 | Jeffers | |
| 4,462,271 A * | 7/1984 | Stieg | 475/86 |
| 4,529,080 A | 7/1985 | Dolan | |
| 4,555,962 A | 12/1985 | Bucarelli | |
| 4,770,280 A * | 9/1988 | Frost | 192/53.343 |
| 6,432,020 B1 * | 8/2002 | Rivera et al. | 475/231 |
| 6,551,209 B2 * | 4/2003 | Cheadle et al. | 475/150 |
| 6,619,153 B2 | 9/2003 | Smith et al. | |
| 6,780,137 B1 | 8/2004 | Langenfeld | |
| 7,264,568 B2 * | 9/2007 | Ludwig et al. | 475/233 |
| 2004/0132572 A1 | 7/2004 | Ludwig et al. | |
| 2007/0225106 A1 * | 9/2007 | Veldman et al. | 475/231 |

OTHER PUBLICATIONS

Int'l Search Report, Nov. 19, 2007, Metaldyne Company LLC.

* cited by examiner

*Primary Examiner*—David D Le
*Assistant Examiner*—Justin Holmes
(74) *Attorney, Agent, or Firm*—McDonald Hopkins LLC

(57) ABSTRACT

The present invention includes novel apparatus and methods for engaging and disengaging a locking differential. In an embodiment, an assembly for use with a locking differential is provided. The assembly includes an actuator, a housing, a shaft, a pair of biasing members, a side gear, and a locking pin. The actuator is arranged to move the assembly from a first position to a second position. The housing is coupled to the actuator. The first biasing member biases the housing, and the second biasing member biases the housing and shaft. The side gear includes an aperture for engaging the locking pin. The locking pin is coupled to the shaft such that the biasing of the shaft determines whether the locking pin is biased into engagement with the aperture or out of engagement with the aperture.

20 Claims, 6 Drawing Sheets

OVER-CENTER LINKAGE FOR ENGAGING A LOCKING DIFFERENTIAL OR OTHER MECHANISM

CROSS-REFERENCE TO RELATED APPLICATION

This non-provisional patent application claims the benefit of U.S. Provisional Patent Application No. 60/787,331, entitled "OVER-CENTER LINKAGE FOR ENGAGING A LOCKING DIFFERENTIAL OR OTHER MECHANISM," filed Mar. 30, 2006, which is hereby incorporated in its entirety.

FIELD OF THE INVENTION

The present invention relates generally to locking differentials, and, more particularly, the present invention relates to over-center linkage assemblies for engaging and disengaging a locking differential or other mechanism.

BACKGROUND

Differentials are known in the mechanical arts and are commonly used in the automotive industry. Generally, a differential is a device that receives an input force through a mechanical linkage and divides that input force into two or more output forces. The output forces are delivered to different mechanical components. In the automobile industry, differentials are commonly used to divide force (in the form of torque) generated by a vehicle engine between the front two or the rear two wheels of the vehicle. Differentials are typically arranged to divide the torque generated by the engine between two wheels of a vehicle such that the wheels receive generally equal torque while being capable of rotating at two different speeds. Such an arrangement increases the handling of a vehicle, decreases damage to tires, and decreases strain on the vehicle's powertrain. For example, when a vehicle turns a corner, the outer wheel travels a father distance than the inner wheel. In a vehicle not equipped with a differential, such cornering results in the inner tire spinning or the outer tire dragging. For a vehicle equipped with a differential, the inner tire is allowed to rotate at a slower speed than the outer tire, which reduces or eliminates handling issues and unnecessary wear as the vehicle rounds a corner.

In addition to directing torque generated by the engine to the wheels of a vehicle such that wheels may rotate at different speeds, differentials also commonly serve as gear reducers. This gear reducing function slows the rotational speed of the transmission before the torque is directed to the wheels.

As differentials are important to the automobile industry, as sell as to the mechanical arts in general, there is an ongoing need for novel mechanisms for differentials and novel methods for using differentials.

SUMMARY OF INVENTION

The present invention includes novel apparatus and methods for engaging and disengaging a locking differential. In an embodiment, an assembly for use with a locking differential is provided. The assembly includes an actuator, a housing, a shaft, a pair of biasing members, a side gear, and a locking pin. The actuator is arranged to move the assembly from a first position to a second position. The housing is coupled to the actuator. The first biasing member biases the housing, and the second biasing member biases the housing and shaft. The side gear includes an aperture for engaging the locking pin. The locking pin is coupled to the shaft such that the biasing of the shaft determines whether the locking pin is biased into engagement with the aperture or out of engagement with the aperture.

DETAILED DESCRIPTION OF THE INVENTION

While the invention described herein is described with reference to the preferred embodiment of utilizing the invention for engaging and disengaging a locking differential, it should be clear that the mechanism may be used for any other type of appropriate mechanism. Further, it should be clear that actuation can be achieved by utilizing an electrical actuator, cable mechanism actuator, or any other actuator mechanism as desired This disclosure is directed to novel mechanisms and methods for engaging and disengaging a locking differential. In addition, this disclosure is directed to mechanisms and methods for moving a locking differential between an engagement position and a disengagement position.

Generally, an over-center linkage assembly is provided. The over-center linkage assembly is arranged such that it may be placed into one of two positions: a first position, where the assembly acts on the locking differential to engage the locking differential or acts on the locking differential to prepare the locking differential to engage; and a second position, where the assembly acts on a locking differential to disengage the locking differential or prepares the locking differential to disengage. The assembly is arranged such that once the assembly is in either the engagement position or the disengagement position, the assembly remains in that position until an actuator acts to alter the position of the assembly. The actuator is generally arranged to move or toggle the assembly between the engagement and disengagement positions.

As the over-center linkage assembly has been above-described in general terms, embodiments of the over-center linkage will be further described with reference to the figures. Throughout the description, movements of components or mechanisms will be described with reference to the figures, e.g., a movement of a component "to the right" indicates that component moves from left to right as illustrated in the figures.

Figure 1:
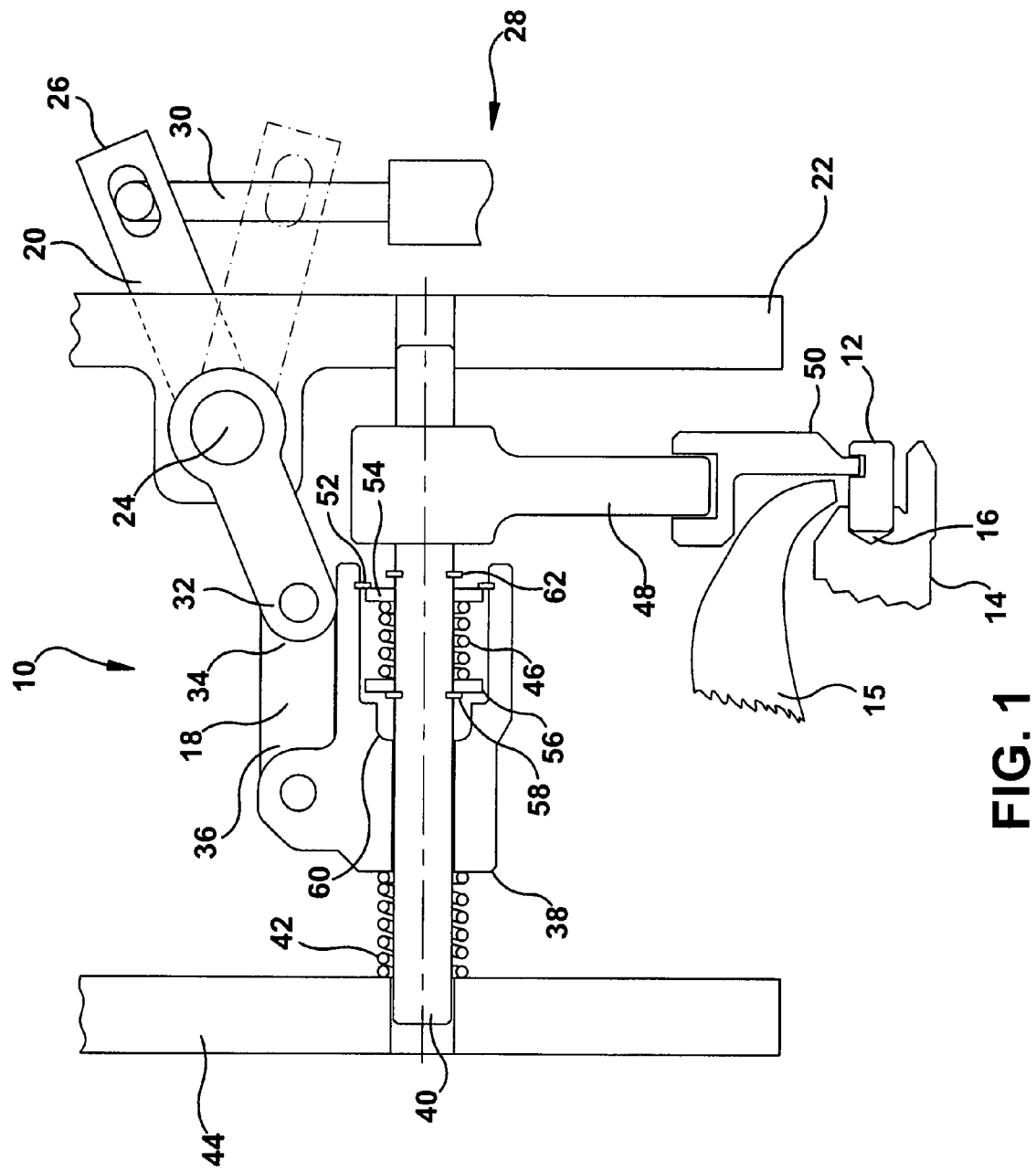
FIG. 1 is a schematic cross-sectional view of an embodiment of an over-center linkage assembly in accordance with the present invention, where the assembly is in an engagement position.
Figure 4:
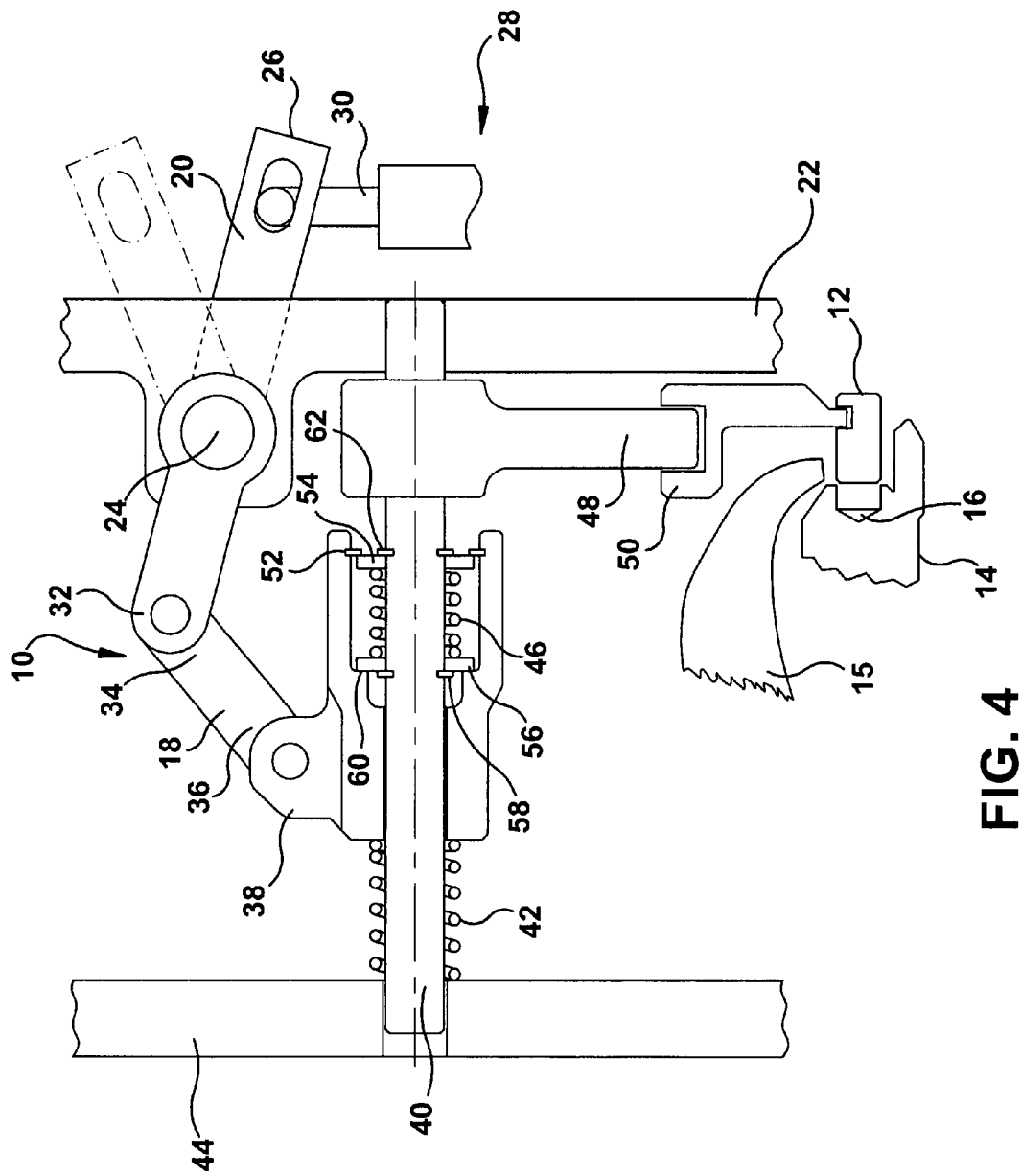
FIG. 4 is a schematic cross-sectional view of an embodiment of an over-center linkage assembly in accordance with the present invention, where the assembly is in a disengagement position.

As illustrated by the figures, the over-center linkage assembly 10 is arranged to move a locking pin 12 of a differential into and out of engagement with a side gear 14 and a differential housing 15. As best seen in FIG. 1, the locking pin 12 passes through an aperture in the differential housing 15 to engage the side gear 14. The pin 12 engages the side gear 14 by entering into and being seated in an aperture 16 located in the side gear 14. As best seen in FIG. 4, the locking pin 12 disengages the side gear 14 when the locking pin 12 withdraws from the aperture 16. With regard to a differential utilized in a rear-wheel drive automobile, the rear axles are locked when the pin 12 is engaged in the aperture 16 and the side gear 16 is fixed to the differential housing 15, and the rear axles are unlocked when the pin 12 is disengaged from the aperture 16. Although differentials are described herein as utilized in automobiles, it will be readily understood by those skilled in the art that the present invention may be practiced on a wide variety of vehicles, machines, apparatus, mechanisms, and the like.

As illustrated in the figures, the over-center linkage assembly 10 includes a slide crank operator 18 and a slide crank lever 20. The slide crank lever 20 is pivotally mounted to a first support member 22 such that the lever 18 rotates about the point of attachment 24 to the support member 22. A first end 26 of the slide crank lever 20 is coupled to an actuator 28 by a linking member 30 such that the actuator 28 may move the first end 26 of the lever 20 vertically. As used herein, the term "coupled" means directly or indirectly attached, connected, or linked in a mechanical or other such manner. Throughout the description, linking members such as, for example, the slide crank operator 18 and the slide crank lever 20, are described as "cranks," "operators," and "levers;" however, such terms are not intended to limit the structure, use, or function of such linking members in any way. Linking members may be rods, arms, beams, shafts, or any other such element or member provided sufficient structure is provided to transfer or translate force or movement.

The actuator 28 as illustrated and described herein provides linear displacement. It will be readily understood by those skilled in the art that such linear displacement may be achieved through a variety of mechanical arrangements such as, for example, a piston, a lever, a cam, and the like. Further, it will be understood that the invention may be practiced with an actuator that provides displacement that is nonlinear. In addition, the actuator may be an electrical actuator, a manual actuator, or any other mechanism that affects movement of the assembly 10.

A second end 32 of the slide crank lever 20 is pivotally coupled to a first end 34 of the slide crank operator 18. A second end 36 of the slide crank operator 18 is pivotally coupled to a housing 38, which is slidably mounted onto a shaft 40. The shaft 40 is mounted in clearance holes or slots in the first support member and a second support member 44. The shaft 40 is mounted to the support members 22 and 44 such that the shaft 40 may slide or otherwise move relative to the support members 22 and 44.

A securing spring 42 is mounted on the shaft 40, positioned between the housing 38 and the second support member 44, and arranged to generally bias the housing 38 to the right. As will be further described, the securing spring 42 generally secures the assembly 10 in both the engagement and disengagement positions such that movement of the actuator 28 must overcome the biasing force of the securing spring 42 to toggle the assembly 10 between positions.

A locking pin biasing spring 46 is mounted on the shaft 40 and located within the housing 38. The pin biasing spring 46 is arranged to selectively bias both the housing 38 and the shaft 40. As will be further described, as the pin biasing spring 46 biases the housing 38 and shaft 40, the locking pin 12 is biased into and out of engagement with the aperture 16 in the side gear 14. Additionally, a fork 48 is mounted on the shaft 40 and extends downward from the shaft 40. The fork 48 is coupled to a differential collar 50, which is in turn coupled to the locking pin 12.

The securing spring 42 and locking pin biasing spring 46 may be coil compression springs or any other type of biasing member, provided the biasing member is capable of providing a biasing force to the housing 38 or the shaft 40. In an embodiment, the securing spring 42 and locking pin biasing spring 46 are both coil compression springs, where the securing spring 42 has a higher load or rate than the pin biasing spring 46. Such an arrangement will produce an assembly 10 where the securing spring 42 provides a force to the housing 38 that is greater than forces provided by the pin biasing spring 46 to the housing 38 and shaft 40. Bias and biasing as used herein means to influence a component, member, element, or the like. Such as, for example, applying a mechanical force to a component, member, or element to influence that component, member, or element to move in a direction or in a particular way. Bias and biasing includes directly influencing a component, member, or element through direct contact with that component, member, or element, as well as indirectly influencing a component, member, or element through contact with intermediate components, members, or elements.

As will be further described, the actuator 28, slide crank lever 20, slide crank operator 18, housing 38, shaft 40, and springs 42 and 46 dynamically interact to engage and disengage the locking pin 12 from the side gear 14.

Figure 2:
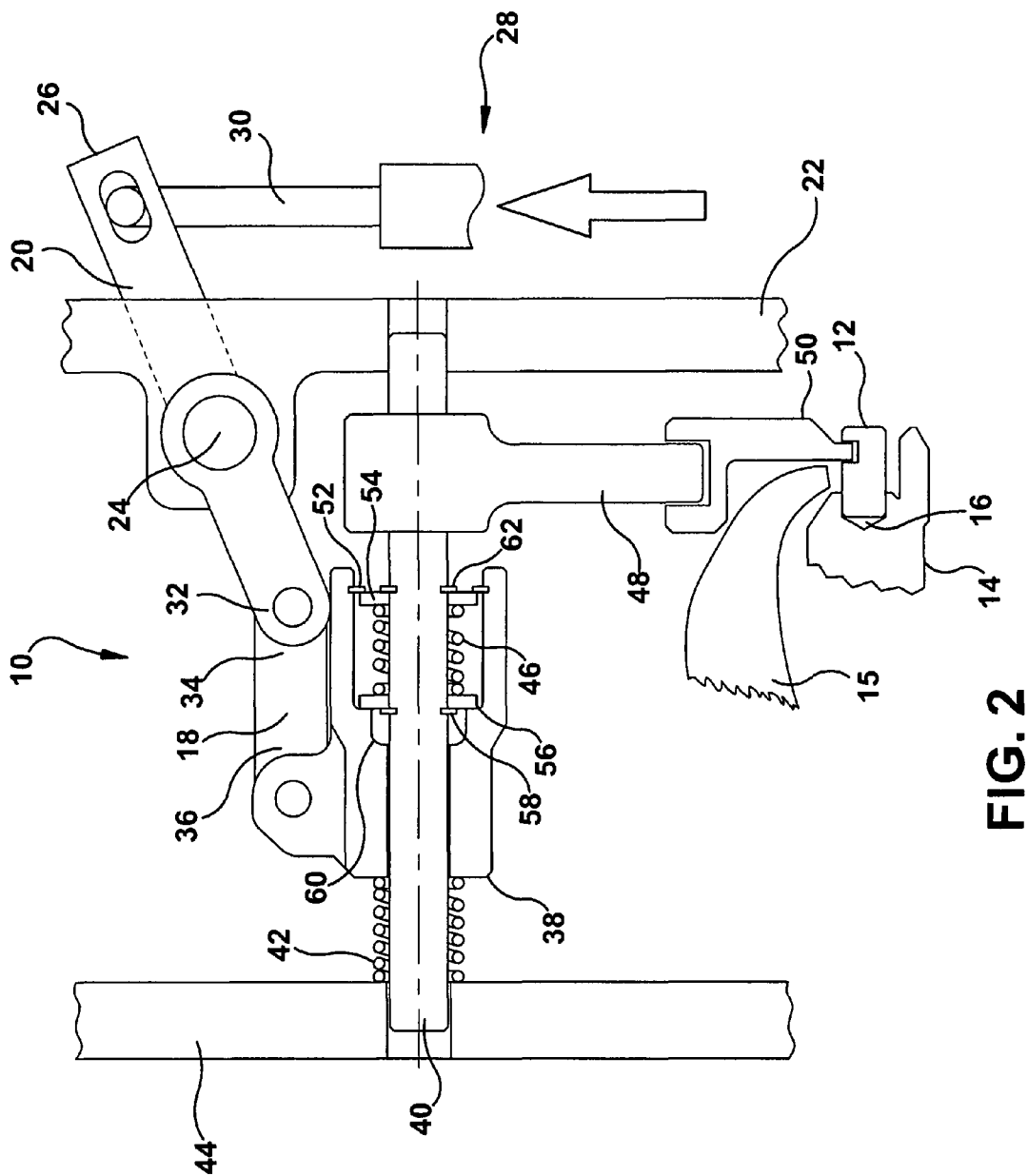
FIG. 2 is a schematic view of the over-center linkage assembly of FIG. 1, where a locking pin is engaged with a side gear.
Figure 3:
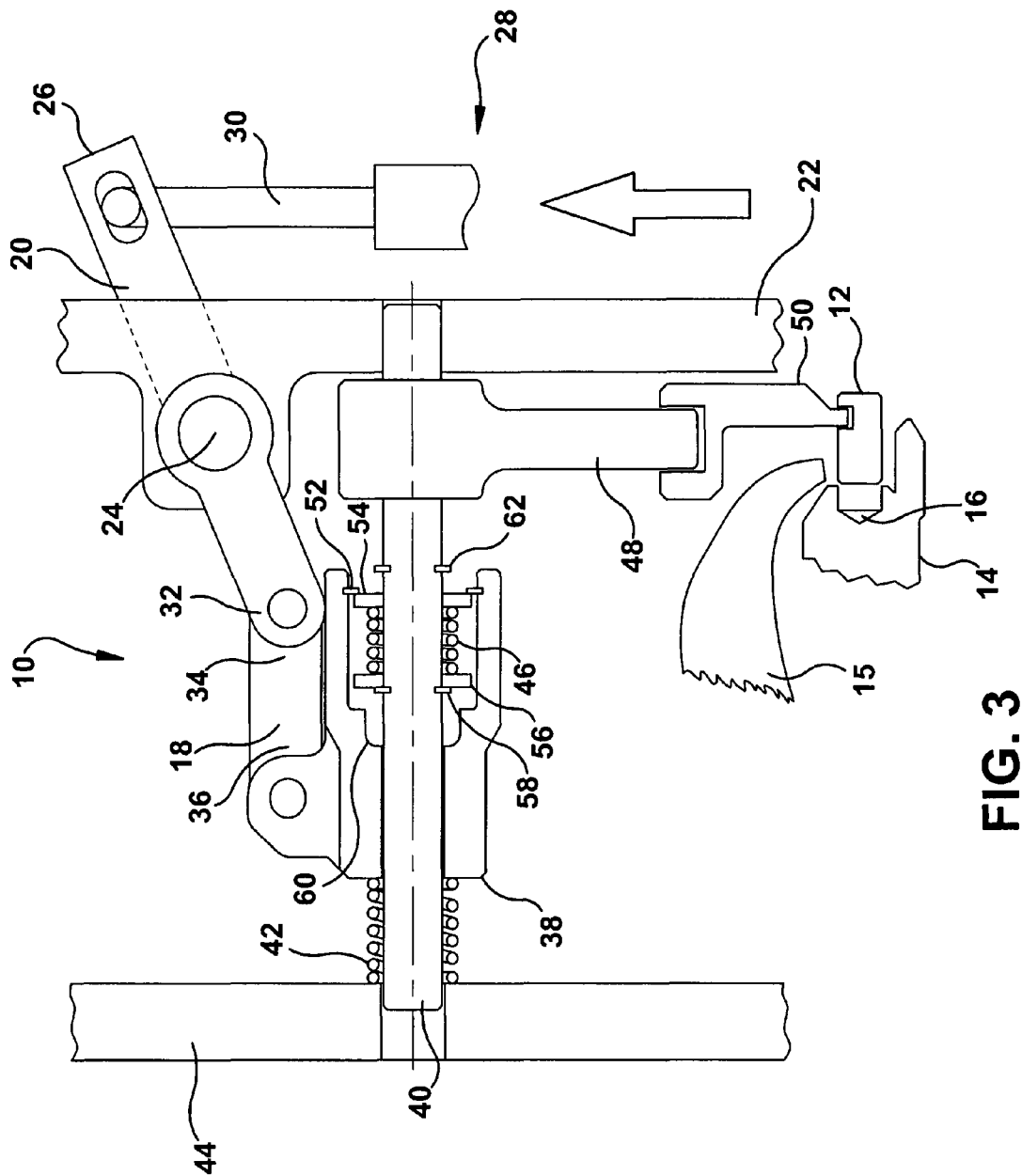
FIG. 3 is a schematic view of the over-center linkage assembly of FIG. 1, where a locking pin is biased towards engagement with a side gear.

FIGS. 1 through 3 illustrate the over-center linkage assembly in an engagement position. As can be seen, the actuator 28 is arranged such that the linking member 30 is fully extended to rotate the slide crank lever 20 counterclockwise, where the first end 26 of the lever 20 is positioned at its upward most position. For reference, the disengagement position of the lever 20 is shown in phantom lines in FIG. 1. In an embodiment, this counterclockwise rotation of the lever 20 forces the slide crank operator 18 into a generally horizontal position and into contact with an outer surface of the housing 38. As the slide crank operator 18 is forced into the horizontal position, its rotational linkage to the housing 38 forces the housing 38 to move to the left along the shaft 40.

The movement of the housing 38 to the left compresses or further compresses the securing spring 42 between the housing 38 and the second support member 44. The compression of the spring 42 creates or enhances a biasing force against the housing 38. This force is transferred through the housing 38 to the slide crank operator 18 such that the operator 18 is encouraged to maintain its horizontal positioning along the outer surface of the housing 38. Such an arrangement results in the biasing force of the compressed securing spring 42 securing the over-center linkage assembly 10 in the engagement position. The assembly 10 is maintained in the engagement position until the actuator 28 acts upon the slide crank lever 20 to move or toggle the assembly 10 to the disengagement position.

The movement of the housing 38 to the left also compresses or further compresses the locking pin biasing spring 46, resulting in biasing forces applied on the housing 38 and shaft 40. These biasing forces are enabled by a series of mechanical stops and retainer rings. The housing 38 compresses the spring 46 through a mechanical stop 52 coupled to the housing 38. As can be seen in FIGS. 1 through 3, the mechanical stop 52 engaging a first retainer ring 54 mounted on the shaft 40, which in turn engages the pin biasing spring 46. The spring 46 places a biasing force on the shaft 40 through the engagement of the spring 46 and a second retainer ring 56, which in turn engages a mechanical stop 58 coupled to the shaft 40. The biasing force as described encourages the shaft 40 to move to the left.

As seen in FIGS. 1 through 3, when the shaft 40 moves to the left, the coupling of the shaft 40, fork 48, differential collar 50, and locking pin 12 results in the locking pin 12 moving to the left to engage the aperture 16 of the side gear 14. However, in order to engage the aperture 16, the locking pin 12 and the aperture 16 must align with each other. Such alignment is not always present at the instance the actuator 28 moves the over-center linkage assembly 10 to the engagement position. When the locking pin 12 and aperture 16 are misaligned, the locking pin 12 will move a short distance to the left in preparation to engage the aperture 16 upon the alignment of the pin 12 and aperture 16.

The assembly 10 encourages the engagement of the pin 12 to the aperture 16 through the arrangement of the locking pin biasing spring 46. As previously described, when the actuator 28 moves the assembly 10 into the engagement position, the housing 38 moves to the left and encourages the shaft 40 to move to the left. If the locking pin 12 and aperture 16 are misaligned, the spring 46 absorbs a portion of the travel of the housing 38, i.e., due to the misalignment of the pin 12 and aperture 16, the shaft 40 does not move to the left as far as the housing 38 moves to the left. Such an arrangement results in the spring 46 provides a biasing force that encourages the shaft 40 to the left. When the pin 12 becomes aligned with the aperture 16, the biasing force of the spring 46 results in the shaft 40 moving left and the pin 12 engages the aperture 16. FIG. 2 illustrates the assembly 10 in the engagement position, where the pin 12 is engaged with the aperture 16. FIG. 3 illustrates the assembly 10 in the engagement position that biases the pin 12 towards the aperture 16. The pin 12 and aperture 16 are misaligned and the pin 12 will engage the aperture 16 upon alignment.

Figure 5:
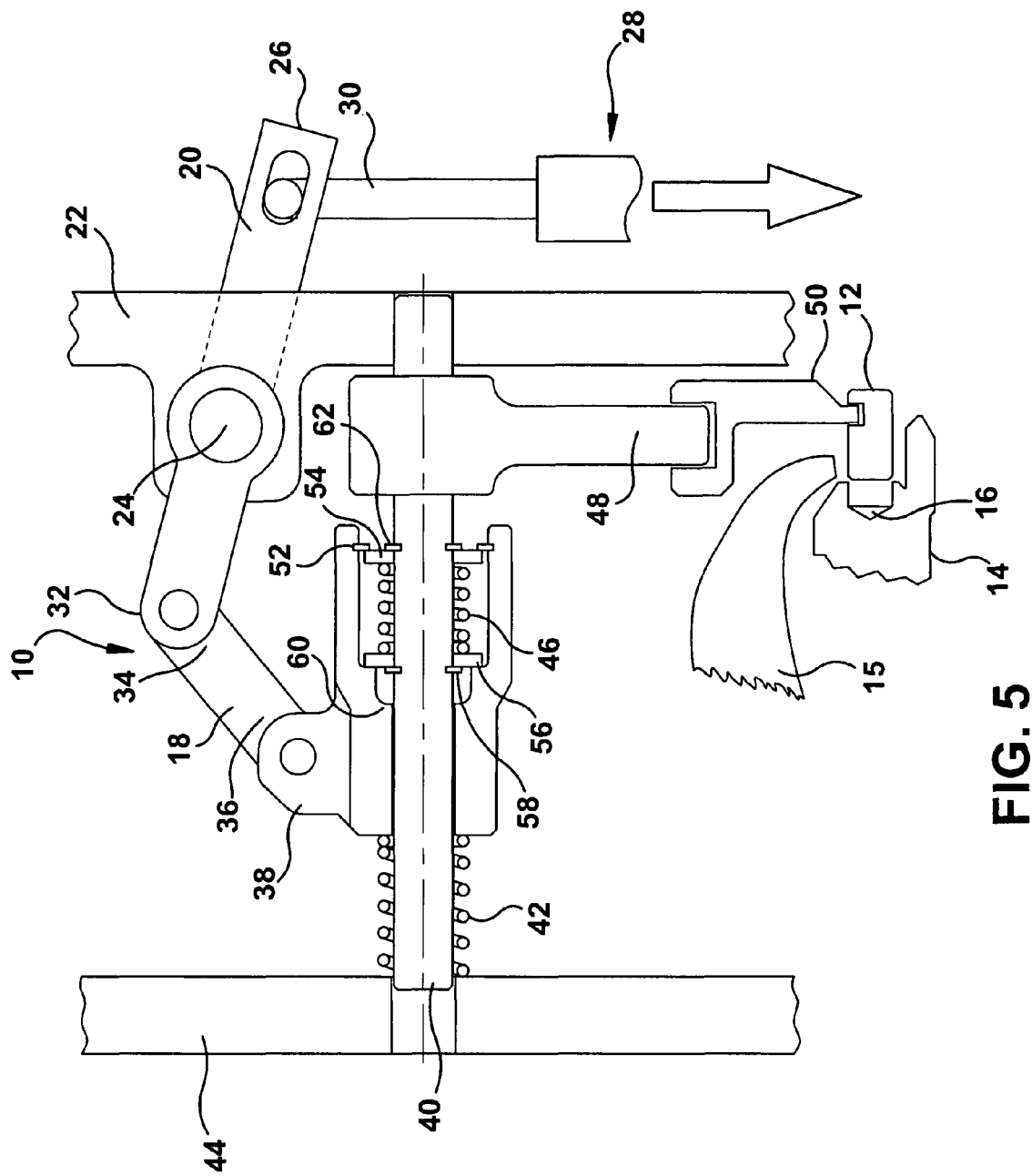
FIG. 5 is a schematic view of the over-center linkage assembly of FIG. 4, where a locking pin is disengaged from a side gear.
Figure 6:
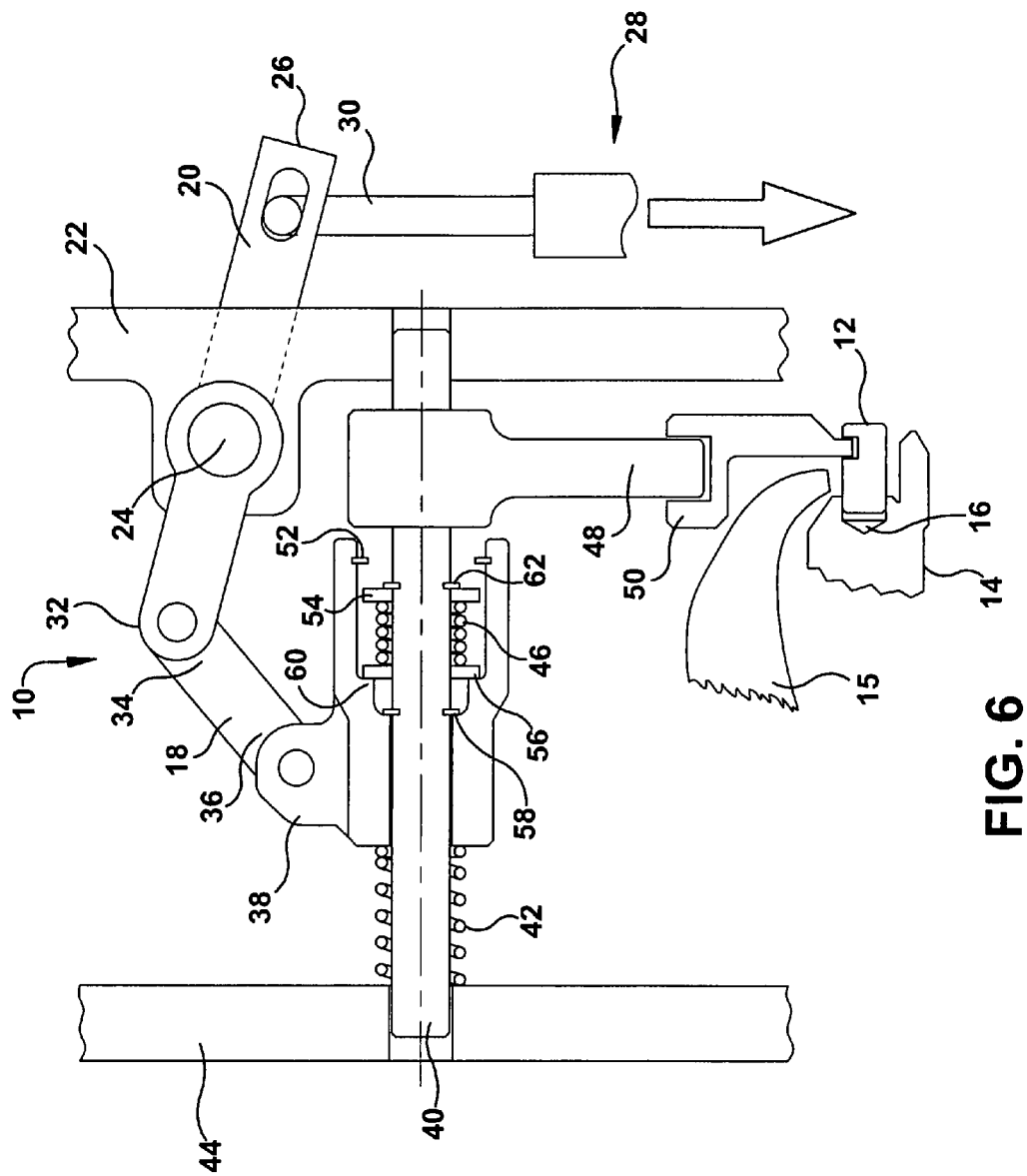
FIG. 6 is a schematic view of the over-center linkage assembly of FIG. 4, where a locking pin is biased towards disengagement from a side gear.

FIGS. 4 through 6 illustrate the over-center linkage assembly in a disengagement position. As seen in the figures, the actuator 28 has retracted the linking member 30 such that the slide crank lever 20 is rotated clockwise with respect to the engagement position. Such rotation results in the first end 26 of the lever 20 being positioned at its downward most position. For reference, the engagement position of the lever 20 is shown in phantom lines in FIG. 4. This clockwise rotation of the lever 20 forces the slide crank operator 18 to rotate counterclockwise. As the slide crank operator 18 is rotated counterclockwise, its rotational linkage to the housing 38 moves the housing 38 to the right along the shaft 40.

The movement of the housing 38 to the right allows the securing spring 42 to expand. It is noted that in an embodiment, even when the housing 38 is positioned at its rightmost position, the securing spring 42 remains in compression and maintains a biasing force on the housing 38 that encouraging the housing 38 to the right. This biasing force is transferred through the housing 38 to the slide crank operator 18 to encourage the operator 18 to further rotate in the counterclockwise direction. In such an arrangement, the biasing force of the securing spring 42 secures the over-center linkage assembly 10 in the disengagement position until the actuator 28 acts upon the slide crank lever 20 to move the assembly 10 to the engagement position. Until the actuator 28 acts in such a way, the assembly 10 will be maintained in the disengagement position. To limit the overall travel of the housing 38, slide crank operator 18, or slide crank lever 20, stops may be employed to limit the distance the housing 38 may move to the right along the shaft 40, to limit the counterclockwise motion of the operator 18, or to limit the clockwise motion of the lever 20.

The movement of the housing 38 to the right compresses or further compresses the locking pin biasing spring 46. The compression of the spring 46 is achieved by a shoulder 60 of the housing 38 engaging the second retainer ring 56 mounted on the shaft 40, which in turn engages the spring 46. The spring 46 places a biasing force on the shaft 40 by the spring 46 engaging the first retainer ring 54, which in turn engages a second mechanical stop 62 coupled to the shaft 40. Such biasing force encourages the shaft 40 to move to the right. It will be understood by those skilled in the art that the shoulder 60 of the housing 38 may perform substantially as a mechanical stop in engaging a retainer ring.

As seen in FIGS. 4 through 6, when the shaft 40 moves to the right, the coupling of the shaft 40, fork 48, differential collar 50, and locking pin 12 results in the locking pin 12 moving to the right and disengaging the aperture 16 of the side gear 14. However, when the locking pin 12 is engaged with the aperture 16 and the gear is rotating, frictional forces may cause the pin 12 to remain engaged in the aperture 16 even when the assembly 10 is placed in the disengagement position. As the rotation of the side gear 14 slows or stops, the frictional forces are overcome by the biasing force of the spring 46, and the pin 12 disengages from the aperture 16. When the pin 12 is under these frictional forces, the biasing force applied by the second spring 46 prepares the pin 12 to disengage as soon as frictional forces are sufficiently reduced and are overcome by the biasing force of the pin biasing spring 46.

In the practice of this invention, an operator of a vehicle, machine, mechanism, etc. that utilizes an over-center linkage assembly need only actuate the assembly to toggle between an engagement position and a disengagement position. The operator need not continue to monitor the status of the alignment of the locking pin and aperture or the rotational speed of the side gear. The embodiments as described will engage the differential or disengage the differential at the next available opportunity without the operator having to monitor the situation.

While the invention has been described with reference to the preferred embodiments, other modifications and design changes can be appreciated upon the reading of the disclosure, along with the accompanying drawings. As such, nothing in the present description should be implied to limit the invention from what is claimed below.

Having thus described the invention, we claim:

1. An assembly for use in locking and unlocking a locking differential, the assembly comprising:
   an actuator capable of selectively moving the assembly between a first state and a second state;
   a first linking member coupled to the actuator;
   a housing pivotally coupled to said first linking member, the housing slideably mounted on a shaft, wherein the shaft is movable between a first position and a second position;
   a locking pin coupled to the shaft;
   a first biasing member biasing the housing in a first direction;
   a second biasing member biasing the housing and shaft in a second direction approximately opposite said first direction.

2. The assembly of claim 1, where when the assembly is in the first state, the second biasing member biases the locking pin toward locking the differential.

3. The assembly of claim 1, where when the assembly is in the second state, the second biasing member biases the locking pin toward unlocking the differential.

4. The assembly of claim 1, where the actuator receives an input to move the assembly between the first and second states.

5. The assembly of claim 1 further comprising:
a second linking member interconnecting the first linking member and the actuator.

6. The assembly of claim 5, where the first biasing member is slidably mounted on the shaft and abuts the housing.

7. The assembly of claim 5, where the second biasing member is at least partially located in the housing and slideably mounted on the shaft.

8. The assembly of claim 7, where the housing includes a mechanical stop, where movement of the housing along the shaft moves the mechanical stop into engagement with the second biasing member to bias the locking pin toward locking the differential.

9. The assembly of claim 7, where the housing includes a mechanical stop, where movement of the housing along the shaft moves the mechanical stop into engagement with the second biasing member to bias the locking pin toward unlocking the differential.

10. The assembly of claim 7, where the shaft includes a mechanical stop, wherein the second biasing member engages the mechanical stop to bias the locking pin toward locking the differential.

11. The assembly of claim 7, where the shaft includes a mechanical stop, wherein the second biasing member engages the mechanical stop to bias the locking pin toward unlocking the differential.

12. An over-center linkage mechanism for engaging a locking differential, the mechanism comprising:
an actuator;
a first linking member coupled to the actuator;
a second linking member pivotally coupled to the first linking member;
a housing pivotally coupled to the second linking member;
a shaft coupled to a locking pin of the locking differential;
a first biasing member mounted on the shaft for biasing the housing in a first direction; and
a second biasing member located at least partially in the housing and mounted on the shaft for biasing the housing and the shaft in a second direction approximately opposite said first direction;
wherein the housing is slideably mounted to the shaft.

13. The mechanism of claim 12, where the actuator moves the mechanism between a first position and a second position.

14. The mechanism of claim 13, where the mechanism in the first position biases the locking pin toward engagement with a side gear of the locking differential.

15. The mechanism of claim 13, where the mechanism in the second position biases the locking pin toward disengagement with a side gear of the locking differential.

16. The mechanism of claim 13, where the actuator moves the mechanism between the first and second positions when receiving an input.

17. The mechanism of claim 13, where movement of the mechanism between the first position to the second position slides the housing along the shaft.

18. The mechanism of claim 17, where the sliding of the housing along the shaft engages the second spring to bias the shaft.

19. The mechanism of claim 18, where the biasing of the shaft encourages the locking pin toward engagement with a side gear of the locking differential.

20. The mechanism of claim 18, where the biasing of the shaft encourages the locking pin toward disengagement with a side gear of the locking differential.

* * * * *